TIME DELAY CIRCUIT

Filed Feb. 15, 1961

WITNESSES:
Bernard R. Giegue
James F. Young

INVENTORS
Sheldon D. Silliman &
David L. Griscom.
BY
Ralph W. McIntire
ATTORNEY

United States Patent Office 3,144,568
Patented Aug. 11, 1964

3,144,568
TIME DELAY CIRCUIT

Sheldon D. Silliman, Forest Hills, and David L. Griscom, Pittsburgh, Pa., assignors to Westinghouse Electric Corporation, East Pittsburgh, Pa., a corporation of Pennsylvania Filed Feb. 15, 1961, Ser. No. 89,571
1 Claim. (Cl. 307—132)

This invention relates generally to time delay circuits, and relates particularly to time delay circuits comprised of static elements.

In many relay systems, such as supervisory control systems for example, it is desirable to effect time delay operation of predetermined ones of the various relays in order to assure proper sequential relay switching operations. For this purpose, there are commercially available standard telephone type relays having a copper slug or a copper sleeve, or both, for effecting predetermined time delay operation of the relay.

In special applications of relay systems where contaminated atmosphere, in general, and dust in particular, threatens to reduce the reliability of the relays, it has been suggested that the relays be hermetically sealed. However, hermetically sealed relays of the time delay type are not generally commercially available.

It is an object of this invention to provide a time delay circuit for increasing the normal time of response of a relay to a relay operation signal.

It is another object of this invention to provide a time delay circuit externally attached to a hermetically sealed relay to effect delayed operation of the relay.

It is another object of this invention to provide a time delay circuit comprised of static elements for increasing the time lapse between an input signal and operation of the relay.

Other objects will, in part, be obvious and will, in part, be described hereinafter.

In practicing this invention, a normally cut-off transistor is series connected with a source of voltage and with the electrodes of a hermetically sealed relay, wherein the cut-off condition of the transistor provides an open circuit deenergizing the relay. A momentary push-button is provided for operation to connect a current source through a resistance-capacitance timing circuit to bias the transistor in the forward direction, thus effecting conduction and saturation of the transistor for providing energization of the relay. A Zener diode in the control circuit of the transistor cooperates with the resistance-capacitance circuit to switch the transistor from cut-off to saturation at the end of a predetermined period of time, at the end of which period the threshold value of the Zener diode is exceeded to effect conduction of the transistor. The resistance in the resistance-capacitance circuit is variable to select a time constant establishing a desirable time delay for the sealed relay.

Figure 1:
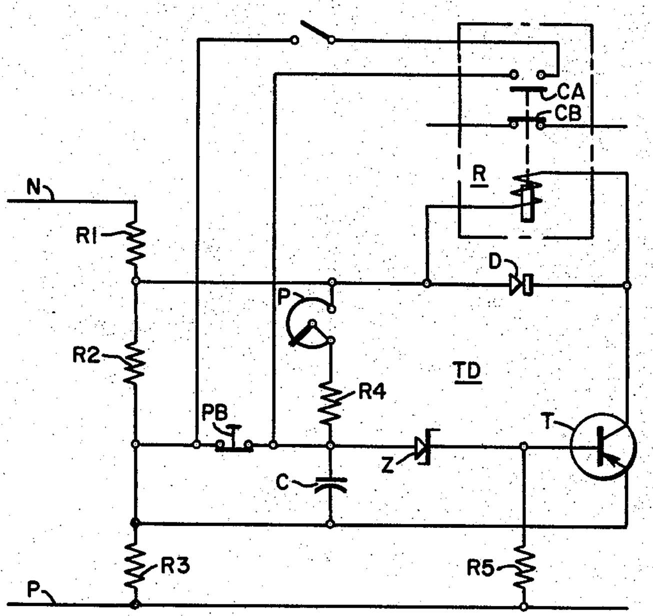
Figure 2:
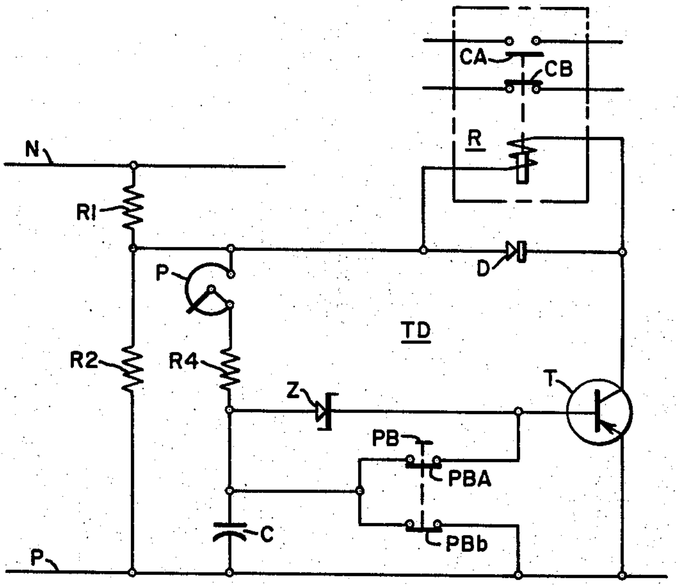

For a more complete understanding of the nature and scope of our invention, reference may be made to the following detailed description which may be read in connection with the accompanying drawing, in which:

FIGURE 1 is a diagrammatic view of a time delay control circuit embodying the invention in one of its forms; and, FIG. 2 is a diagrammatic view of another form of the invention.

Referring to FIG. 1, a hermetically sealed relay R is shown being supplied through a time delay circuit generally indicated at TD. A source of voltage having a negative terminal N and a positive terminal P provides the input for operating the time delay system TD and the relay R in a manner described below.

In the basic time delay circuit TD, the output for energizing and deenergizing the sealed relay R is provided by a transistor T having its emitter-collector circuit series connected with the coil of the sealed relay R.

In order to provide for establishing the voltage across the transistor T at a predetermined level, such as 24 volts, depending upon the particular rating of the transistor T, there is provided a voltage divider comprised of resistors R1, R2 and R3, connected across the source terminals N and P. The energizing circuit for relay R extends from positive P through resistor R3 of the voltage divider, the emitter-collector electrodes of transistor T, the coil of relay R and resistor R1 of the voltage divider to negative N.

In order to control operation of the transistor T in a switching mode to either energize or deenergize the relay R, there is provided a start push-button PB connected across the emitter-base electrodes of transistor T so that when the push-button is closed, the base and emitter are at essentially zero potential, thus maintaining the transistor T in the cut-off condition to effectively open the previously described energizing circuit for the coil of relay R.

In order to provide for biasing the transistor T in a forward direction to effect delayed saturation, and thus effect closing of the previously described energizing circuit for the coil of relay R, there is provided a resistance-capacitance system comprised of a potentiometer P, a resistor R4 and a capacitor C series connected across the resistor R2 in the voltage divider. The capacitor C of the delay system is connected in parallel with the push button PB across the base-emitter electrode of the transistor T so that a build-up of voltage across the capacitor C provides a gradually increasing voltage differential across the base-emitter electrode of transistor T to bias the transistor in the forward direction an deffect a change in condition of operation of the transistor T from cut-off to saturation.

In order to provide operation of the transistor T in a switching mode, and to delay switching of the transistor from cut-off state to the saturation state for a predetermined time after an opening operation of the push button PB, there is provided a reference diode Z of the Zener type in series connection with the capacitor C and the base-emitter electrodes of the transistor T. The reference diode Z will conduct at predetermined potential such as 8 volts, in response to build-up of potential across the capcitor C, thus allowing switching of transistor T to saturation to thus effect energization of relay R.

In order to prevent the inductive voltage of relay R from reaching a high value which could damage the transistor T, there is provided a diode D which is connected across the coil.

In order to provide for a sufficient reverse current to compensate for the leakage current from the collector to the base of the transistor T, which leakage may occur at particular temperatures, depending upon the type of transistor used, resistor R5 is connected at one end to the base electrode of transistor T and at the other end to the positive terminal P of the source. Thus, resistor R5 cooperates with resistor R3 in establishing a reverse positive bias of predetermined value, such as 1.0 volt, on the base of the transistor T. The bias circuit may be traced from positive P through resistor R5, the base to emitter electrodes of transistor T, resistors R2 and R1 to negative N. The relative values of resistors R3 and R5 are selected to provide the desired positive voltage on the base electrode of transistor T. If desired, R5 could be a temperature sensitive resistor or thermistor to provide partial automatic compensation for a wide range of ambient temperature operation.

In normal operation of the time delay circuit, the push button switch PB is closed. The voltage across capacitor C is zero because of the shunting operation of push button PB. The transistor T is thus cut off because of the zero voltage across the base and emitter provided by the shunting push button switch PB. When the push button start switch PB is operated, the shunt around capacitor C is removed and the capacitor C begins to charge exponentially through operation of the circuit existing from positive P through resistor R3, capacitor C, resistance R4, potentiometer P and resistor R1, the time constant being adjusted in accordance with the setting of the potentiometer P. After a predetermined time lapse as governed by the time constant of the resistance-capacitance circuit, a predetermined voltage is produced across the capacitor C, for example, 8 volts, and the reference diode Z conducts to provide current flow from the emitter to the base through a circuit extending from positive P, through resistor R3, the emitter to base electrodes of transistor T, the Zener diode Z, resistance R4, potentiometer PO and resistor R1 to negative N. The transistor T switches to the saturated state to complete the operating circuit for relay R, which circuit may be traced from positive P through resistor R3, transistor T, relay R and resistor R1 to negative N.

When the start push button PB is reclosed, the shunt is reestablished to effect a rapid discharge of capacitor C, thus eliminating the forward bias across the emitter to base circuit of transistor T to effect cutoff of the transistor T for interrupting the previously described operating circuit for relay R. As the field collapses in the winding of relay R to provide a voltage tending to continue the flow of current in the relay R circuit, the diode D shunts the core of the relay R to prevent excessive voltage rise.

The foregoing time delay circuit may be readily utilized as a pulsing circuit by utilizing a set of make contacts CA of relay R in parallel with push button PB so that operation of the relay R will effectively perform the same operation as that above described with respect to the reclosing of the push button PB.

FIG. 2 of the drawing illustrates another embodiment of the invention wherein the base of the transistor T is grounded to prevent unscheduled operation of the relay R as produced by leakage current under both normal and high ambient temperatures.

The structure of FIG. 2 is substantially identical with that previously described in FIG. 1 and accordingly corresponding parts have been given the same reference numerals. The capacitor C and the base of transistor T are grounded through two sets of contacts PB*a* and PB*b* on push button PB. Specifically, capacitor C is normally deenergized by way of a shunt circuit which may be traced from positive P through contacts PB*b* to the upper side of the capacitor. The base of transistor T is grounded through a circuit extending from positive P through contacts PB*b* and PB*a* to the base electrode.

The operation of the apparatus of FIG. 2 is identical to that described above. Normally, the voltage across capacitor C and across the base to emitter circuit of transistor T is zero as provided by the previously described circuits through the contacts PB*a* of the push button switch PB when in the closed condition. When the push button PB is opened, eliminating the short circuits, capacitor C charges exponentially through resistor R4, potentiometer P and resistor R1 until Zener diode Z breaks down allowing current flow in transistor T to effect saturation of transistor T and energization of relay R. The closing of push button PB grounds capacitor C and the base to emitter circuit of transistor T to cut off transistor T and deenergize relay R.

Although the invention is described in connection with the particular time delay circuits described above, it will be obvious that it has adaptations and modifications which may be made to effect other forms of the system. Accordingly, it is not intended to limit this application to the specific system disclosed herein.

We claim as our invention:

A time delay circuit means, comprising: circuit means for connecting a source to a relay having plural contact means; said circuit means including a transistor having its emitter and collector electrodes series connected therein; series connected resistance and capacitance means connected across said source; a normally closed start switch means in shunt with said capacitor; means connecting said capacitor across the emitter and base electrodes of said transistor; Zener diode means in series with said capacitance and said emitter and base electrode to oppose forward current load through said emitter and base electrodes and having a predetermined breakdown voltage preventing current flow until the voltage across the capacitance is sufficiently large in response to opening of the start switch means to effect switching of the transistor to saturation and actuation of said relay; one contact means of said plural contact means being connected in parallel with said start switch means to thereby close and discharge said capacitance means independently of said start switch means when said relay is actuated, and said start switch means providing a discharge path for the capacitance means when closed.

References Cited in the file of this patent

UNITED STATES PATENTS

| | | |
|---|---|---|
| 2,867,754 | O'Bleness | Jan. 6, 1959 |
| 2,947,916 | Beck | Aug. 2, 1960 |
| 2,981,898 | St. John | Apr. 25, 1961 |